(12) United States Patent
Brinster et al.

(10) Patent No.: US 10,040,645 B2
(45) Date of Patent: Aug. 7, 2018

(54) METHOD AND GUIDE SYSTEM FOR THE TRANSPORT OF CONTAINERS OR CONTAINER COMPONENTS IN INDUSTRIAL SYSTEMS FOR CONTAINER PRODUCTION AND/OR PRODUCT FILLING

(71) Applicant: KRONES AG, Neutraubling (DE)

(72) Inventors: Paul Brinster, Regensburg (DE); Tobias Eichhammer, Bad Abbach (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 15/320,304

(22) PCT Filed: Mar. 7, 2016

(86) PCT No.: PCT/EP2016/054766
§ 371 (c)(1),
(2) Date: Dec. 19, 2016

(87) PCT Pub. No.: WO2016/155980
PCT Pub. Date: Oct. 6, 2016

(65) Prior Publication Data
US 2017/0253440 A1 Sep. 7, 2017

(30) Foreign Application Priority Data
Apr. 2, 2015 (DE) .................. 10 2015 205 984

(51) Int. Cl.
*B65G 51/03* (2006.01)
*B29C 31/00* (2006.01)
(Continued)

(52) U.S. Cl.
CPC ............ *B65G 51/03* (2013.01); *B29C 31/008* (2013.01); *B65G 39/07* (2013.01); *B65G 47/24* (2013.01);
(Continued)

(58) Field of Classification Search
CPC ..................... B65G 51/035; B65G 47/24
(Continued)

(56) References Cited

U.S. PATENT DOCUMENTS 3,603,646 A 9/1971 Leoff
3,914,152 A * 10/1975 Amberg ................ B29C 63/426
156/380.9

(Continued)

FOREIGN PATENT DOCUMENTS

AU 596797 B2 5/1990
CH 439101 A 6/1967

(Continued)

OTHER PUBLICATIONS

ISA European Patent Office, International Search Report Issued in Application No. PCT/EP2016/054766, dated Jun. 10, 2016, WIPO, 6 pages.

(Continued)

*Primary Examiner* — Joseph Dillon, Jr.
(74) *Attorney, Agent, or Firm* — McCoy Russell LLP

(57) ABSTRACT

The invention relates to a method and guide system for the transport of containers or container components, in particular, preforms and/or closure caps, in industrial systems for container production and/or product filling, wherein the containers/container components are transported along at least one guide element. By generating an air cushion between the guide element and the containers/container components by flowing through a microporous layer formed on the guide element, even container components which are lightweight and/or do not slide well can be reliably slidingly transported along the guide elements, and containers can be reliably supplied to dividing worms or similar using dynamic pressure.

17 Claims, 4 Drawing Sheets

(51) Int. Cl.
*B65G 39/07* (2006.01)
*B65G 47/24* (2006.01)
*B29L 31/00* (2006.01)

(52) U.S. Cl.
CPC .... *B65G 51/035* (2013.01); *B29L 2031/7158* (2013.01); *B65G 2207/06* (2013.01)

(58) Field of Classification Search
USPC ............ 406/53, 88, 89, 90, 91, 52; 414/676; 198/493
See application file for complete search history.

(56) References Cited

U.S. PATENT DOCUMENTS

| | | | | |
|---|---|---|---|---|
| 4,015,751 A * | 4/1977 | Rollins | ................ | B65D 88/72 222/195 |
| 4,019,641 A * | 4/1977 | Merz | ................ | B65G 53/24 406/116 |
| 4,183,702 A * | 1/1980 | Bonnel | ................ | B65G 53/18 406/144 |
| 4,223,778 A * | 9/1980 | Kontz | ................ | B29C 49/4205 198/389 |
| 4,469,229 A * | 9/1984 | Cronan | ................ | B07C 5/02 193/46 |
| 4,650,059 A * | 3/1987 | Fries | ................ | B65G 47/24 198/389 |
| 4,890,726 A * | 1/1990 | Wissmann | ............ | B29C 31/002 198/803.12 |
| 5,311,979 A | 5/1994 | Risley et al. | | |
| 5,421,678 A * | 6/1995 | Aidlin | ................ | B65G 51/035 198/836.3 |
| 5,501,552 A * | 3/1996 | Simkowski | .......... | B65G 51/035 198/450 |
| 5,630,679 A * | 5/1997 | Simkowski | .......... | B65G 51/035 406/196 |
| 5,657,920 A * | 8/1997 | Thiry | ................ | B21J 15/32 227/109 |
| 5,909,815 A * | 6/1999 | Kato | ................ | B07B 13/04 209/651 |
| 6,173,827 B1 * | 1/2001 | Carey | ................ | B08B 5/02 198/402 |
| 6,332,740 B1 * | 12/2001 | Bernard | ............... | B65G 51/035 406/86 |
| 6,439,366 B1 * | 8/2002 | Matkovich | ................ | B07C 5/02 198/360 |
| 6,488,449 B1 * | 12/2002 | Laquay | ................ | B65G 51/035 198/465.4 |
| 6,494,646 B1 * | 12/2002 | Sala | ................ | B65G 51/035 406/88 |
| 7,556,137 B2 * | 7/2009 | Charpentier | ............. | B07C 5/02 198/369.7 |
| 7,971,703 B2 * | 7/2011 | Sato | ................ | B65G 33/06 198/459.4 |
| 8,801,341 B2 * | 8/2014 | Turck | ................ | B65G 51/035 406/197 |
| 9,233,804 B2 * | 1/2016 | Pedrazzini | ........ | B65G 47/1471 |
| 9,340,374 B2 * | 5/2016 | Eisenstock | .............. | B28B 3/224 |
| 9,409,723 B2 * | 8/2016 | Seidl | ...................... | B65G 37/00 |
| 9,527,674 B2 * | 12/2016 | Chen | .................. | B65G 49/066 |
| 9,776,809 B1 * | 10/2017 | Naor | ................... | B65G 47/848 |
| 9,884,733 B1 * | 2/2018 | Pawelski | ............. | B65G 51/035 |
| 2004/0109747 A1 * | 6/2004 | Charpentier | ....... | B65G 47/1428 414/403 |
| 2008/0010852 A1 | 1/2008 | Oechsle et al. | | |
| 2008/0142339 A1 * | 6/2008 | Charpentier | ......... | B65G 15/105 198/626.1 |
| 2008/0196998 A1 * | 8/2008 | Lemaistre | ........... | B29C 49/4205 198/469.1 |
| 2009/0155036 A1 * | 6/2009 | Deyerl | ................ | B29C 49/4205 414/539 |
| 2010/0193325 A1 * | 8/2010 | Charpentier | ........ | B29C 49/4205 198/382 |
| 2010/0327036 A1 | 12/2010 | Koch | | |
| 2011/0120833 A1 * | 5/2011 | Tanner | ................ | B29C 49/4205 198/444 |
| 2011/0198270 A1 * | 8/2011 | Beutl | .................. | B29C 49/4205 209/552 |
| 2012/0087745 A1 * | 4/2012 | Turck | .................... | B65G 51/035 406/46 |
| 2013/0156512 A1 * | 6/2013 | Beutl | .................. | B29C 49/4205 406/86 |
| 2013/0264174 A1 * | 10/2013 | Seidl | ...................... | B65G 37/00 198/604 |
| 2014/0151189 A1 * | 6/2014 | Novak | ................ | B29C 49/4205 198/443 |
| 2016/0083195 A1 * | 3/2016 | Sachs | ................. | B65G 47/1471 198/560 |
| 2016/0159580 A1 * | 6/2016 | Ruigrok | ................ | B65G 47/24 198/617 |
| 2016/0332354 A1 * | 11/2016 | Tanner | ................ | B29C 49/4205 |

FOREIGN PATENT DOCUMENTS

| | | |
|---|---|---|
| DE | 2140520 A | 3/1972 |
| DE | 10322519 A1 | 12/2004 |
| DE | 102009026059 A1 | 12/2010 |
| DE | 102010043791 A1 | 5/2012 |
| DE | 202012003268 U1 | 5/2012 |
| EP | 1215146 A1 | 6/2002 |
| EP | 1867592 A1 | 12/2007 |
| EP | 2221261 A1 | 8/2010 |
| FR | 2077313 A1 | 10/1971 |
| FR | 2101133 A1 | 3/1972 |
| FR | 2556273 A1 | 6/1985 |
| GB | 2290221 A | 12/1995 |

OTHER PUBLICATIONS

State Intellectual Property Office of the People's Republic of China, Office Action and Search Report Issued in Application No. 201680001813.X, dated May 21, 2018, 11 pages. (Submitted with Partial Translation).

* cited by examiner

METHOD AND GUIDE SYSTEM FOR THE TRANSPORT OF CONTAINERS OR CONTAINER COMPONENTS IN INDUSTRIAL SYSTEMS FOR CONTAINER PRODUCTION AND/OR PRODUCT FILLING

The invention relates to a method and a guide system for transporting containers or container components according to the preamble of claims 1 and 7.

Faults in feeding preforms and closure caps occur comparatively frequently in plants for producing containers and/or filling products. They lead to position gaps in the product stream in particular with a fixedly and integrally attached design of individual machines, leading to drop in effective machine performance and downstream sequence errors in processing machines, for example, during labeling. This problem is further increased by the fact that closures and/or preforms are for reasons of costs possibly made of materials with poor and/or fluctuating sliding properties, which restricts the reliability of guide elements such as slide rails or the like.

Additional problems arise where comparatively light container components, such as, for example, closure caps and preforms are to be supplied via inclined ramps by way of gravity. It was previously only possible to remedy this by suitably steep descending stretches and correspondingly large differences in height, for example, with respect to an inlet area at a furnace for preforms. This results in an undesirably space-consuming configuration.

A similar problem is given in the supply of containers under back pressure at inlet stretches or the like, in particular if the containers are made of comparatively poorly sliding material and/or are still warm after production and are therefore restricted in their slidability. This can also lead to containers jamming downstream and to position gaps.

Known from the extrusion technology and from the packaging technology for gentle transportation of foil webs are joining elements with microporous layers through which a gas stream can be guided and an air cushion can be produced between the guide elements and the foil webs, see DE 10 2010 043 791 A1 and DE 10 2009 026 059 A1. A vacuum transfer cylinder for labels is also known from DE 20 2012 003 268 U1, on the outer surface of which microporous structures are formed through which the labels can be sucked onto the vacuum transfer cylinder.

In view of the above-mentioned problems when handling containers and container components, there is a need for methods and guide systems which prevent or at least reduce the number of transport jams and the resulting position gaps in the product stream.

This object posed is satisfied by a method according to claim 1. According thereto, the latter serves to transport containers or container components which are in particular preforms and/or closure caps. Furthermore, the containers/container components are in industrial plants for producing containers and/or filling products transported along at least one guide element. An air cushion is according to the invention created between the guide element and the containers/container components by a stream passed through the microporous layer formed on the guide element.

The containers are, for example, beverage bottles or the like. The containers are made in particular of plastic material, in particular, PET. The microporous layer substantially forms a guide surface facing the containers/container components. The air cushions described are preferably created with compressed air. However, this basically means any gas cushions, for example, caused by an inert gas or purge gas flowing in.

The sliding friction of the containers or container components can thereby be reduced during transportation along the guide element. The risk of the containers/container components jamming thereby decreases, and consequently the frequency of position gaps in the subsequent product stream.

The guide element is preferably configured in such a manner that the containers/container components slide along the microporous layer, in contrast to a roller running along with products, such as a transport roller for a foil web, or a belt circulating in/against the direction of transport. The guide element is also substantially stationary with respect to the product stream. This also includes oscillating or vibrating guide elements in a region that is stationary with respect to the product stream as well as rollers or the like rotating transversely to the product stream.

The air cushion is preferably created during transportation of the containers/container components along a transport lane having a bend. Such bends are formed, for example, at inlet curves for preforms, closure caps, or containers. Comparatively high sliding friction resistance arises there. An air cushion is therefore particularly useful at such bends.

The air cushion is preferably created during transportation of the containers/container components along a transport lane having an inclination. Such transport lanes are used, in particular, with preforms and closure caps. Although these container components are comparatively lightweight, they can with the aid of the air cushion be reliably supplied for further processing sliding on rails or in grooves, in particular also with a comparatively flat-angle inclination. In addition, container components that slide poorly for material reasons and/or due to their shape can be supplied more reliably. Also fluctuations in the material and/or surface quality of the container components are then less critical.

The air cushion is preferably created during single-lane transportation of the container components. In this case, the container components are generally guided on both sides of the transport lane. The air cushion is therefore in single-lane transportation particularly useful for reducing sliding friction resistance. For example, support rings formed on the preforms then slide on both sides over a respective guide element having a microporous layer, for example, a guide rail. Air cushions are then created between the microporous layers and the support ring on both sides of the preform. Closure caps then slide, for example, in a guide groove having a microporous layer/guide surface.

The air cushion is preferably created on at least one sorting roller for sorting and/or aligning the container components, in particular on a pair of adjacent sorting rollers. The axes of rotation of such sorting rollers run substantially parallel to the transport lane of the container components. For example, a part of the sorting roller can on the inlet side then be formed with a comparatively high coefficient of friction in order to accelerate differently oriented container components transversely to the transport lane and to force uniform orientation of the container components on their return to the transport lane, for example, by having performs roll/slide back from a slanted ramp into the transport lane by way of gravity.

A part of the sorting roller downstream and/or at the outlet side can then be equipped with a microporous layer in order to facilitate transportation of the sorted and/or aligned container components by way of air cushions. In this case as well, the spectrum of usable container components can be expanded.

The air cushion is preferably created when feeding containers under back pressure into a treatment machine, in particular adjoining an in-feed worm. For example, at least one lateral guide element having a microporous layer/guide surface is then provided in order to guide the containers with reduced sliding friction under back pressure to the in-feed worm or the like. The containers, for example, bottles with a comparatively poorly sliding surface, are thereby prevented from jamming.

The object posed is also satisfied by a guide system according to claim 7. According thereto, it is suitable for transporting containers or container components, which are in particular preforms and/or closure caps, in industrial plants producing containers and/or filling products. The guide system comprises a transport lane for the containers/container components and at least one guide element being formed in a stationary manner along the transport lane. According to the invention, the guide element comprises at least one inflow duct and a microporous layer connected thereto and facing the transport lane.

A gas flow, in particular compressed air, can be passed through the inflow duct and the microporous layer to create an air cushion between the microporous layer and the containers or container components. The microporous layer can then be understood as being a guide surface with air cushions.

A stationary guide element is understood to mean that its guide surface, in contrast to a transport roller or the like, does not run along with the containers or container components. However, the guide element could, for example, oscillate, vibrate, rotate transversely to the direction of transport or the like.

The transport lane is preferably curved and/or narrows and/or has an inclination. Transport jams and/or position gaps in the product stream occur very frequently between such transport lanes and containers/container components sliding therealong. Microporous layers and air cushions have a particularly favorable effect there.

The guide element is preferably a sorting roller, where the transport lane extends in the longitudinal direction of the sorting roller. The sorting roller then in particular comprises at least two sections in the longitudinal direction having different sliding properties. For example, a microporous layer is then present only at a section of the sorting roller on the outlet side in order to improve onward transportation of previously sorted and/or aligned container components along the sorting roller. The container components with different sliding properties and/or different weights can therewith be reliably sorted and/or aligned as well as reliably transported onward.

The guide element is preferably a lateral inlet rail in the inlet region of an in-feed worm, for example, in the form of a guide railing. It allows the containers to be reliably guided under back pressure along the inlet rail, i.e. without jamming up to the in-feed worm. At this point, there are therefore no position gaps, within the meaning of missing containers, in the product stream.

The microporous layer preferably has a thickness of 10 to 200 μm. A sufficiently uniform air cushion can therewith be created along the surface of the guide element.

Pores preferably having a width of 10 to 100 nm are formed in the microporous layer. This pore size is particularly suitable for the passage of air flows or other gas flows. In other words, a locally evenly distributed air cushion can be created in the microporous layer at a low pressure loss.

Preferably, the guide element comprises a base body made of metal, in particular stainless steel, and the microporous layer is made of material galvanized or sintered thereon. This enables cost-efficient industrial production of sturdy and dimensionally stable guide elements. It would alternatively also be conceivable to provide the microporous layer on the base body by flame spraying.

The microporous layer preferably has a degree of hardness of 30 to 70 HRC. This enables gentle guiding of the containers/container components and ensures sufficient mechanical stability and service life alike of the microporous layer.

The guide system preferably further comprises compressed air supply connected to the inflow duct. Compressed air is typically available in industrial plants for producing containers and/or filling products. The additional complexity of the equipment for creating the air cushions is thereby minimal.

The microporous layers are preferably selectively formed in parts of the guide elements which are designed for slidably guiding container components or containers and can therefore contact the container components or containers during proper transportation. The microporous layers are likewise preferably selectively formed in parts of the guide elements in which there is an increased risk of the container components or containers getting stuck or jamming. For example, only sections of the guide elements that are critical for proper transportation are coated microporously, for example, curves of the transport lane or transitions between horizontal sections of the transport lane and descending stretches. The surface creating the air cushion can thereby overall be minimized and compressed air can be saved.

Preferred embodiments of the invention are illustrated in the drawings, where:

Figure 1:
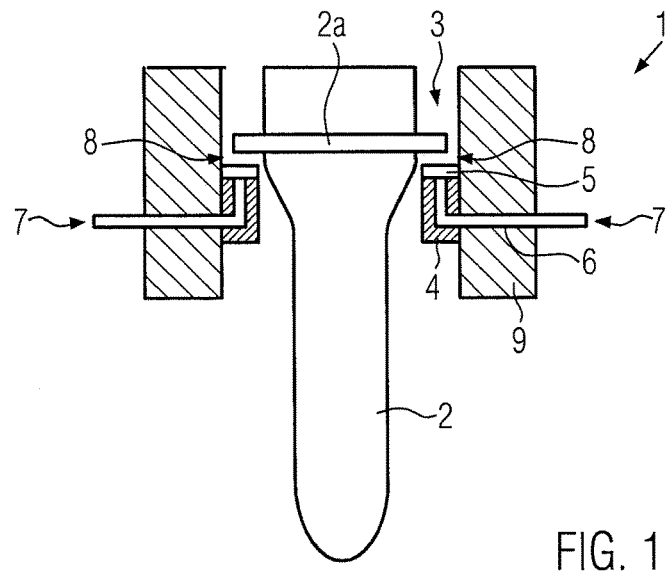
FIG. 1 shows a cross-section through guide elements having a microporous layer.

As is evident from FIG. 1, guide system 1 for transporting container components, in particular preforms 2, according to a first preferred embodiment comprises guide elements 4 having microporous layers 5 and extending on both sides along a guide track 3 (by way of example, pointing out from the drawing plane). Formed in guide elements 4 are inflow ducts 6 through which a flowing gas 7, for example in the form of compressed air, is passed through microporous layer 5 to guide track 3 in order to create an air cushion 8 over microporous layer 5 and under support rings 2a formed on the preforms.

Guide elements 4 are formed in a stationary manner with respect to the product stream of preforms 2 along transport lane 3. Guide elements 4 are attached, for example, to a frame 9 which itself could also have a guiding function and is for the sake of simplicity omitted in FIG. 2. Guide elements 4 are configured for single-lane transportation of preforms 2. Each preform 2 is therefore guided on its own, for example, on both sides on and/or between two guide elements 4.

Figure 2:
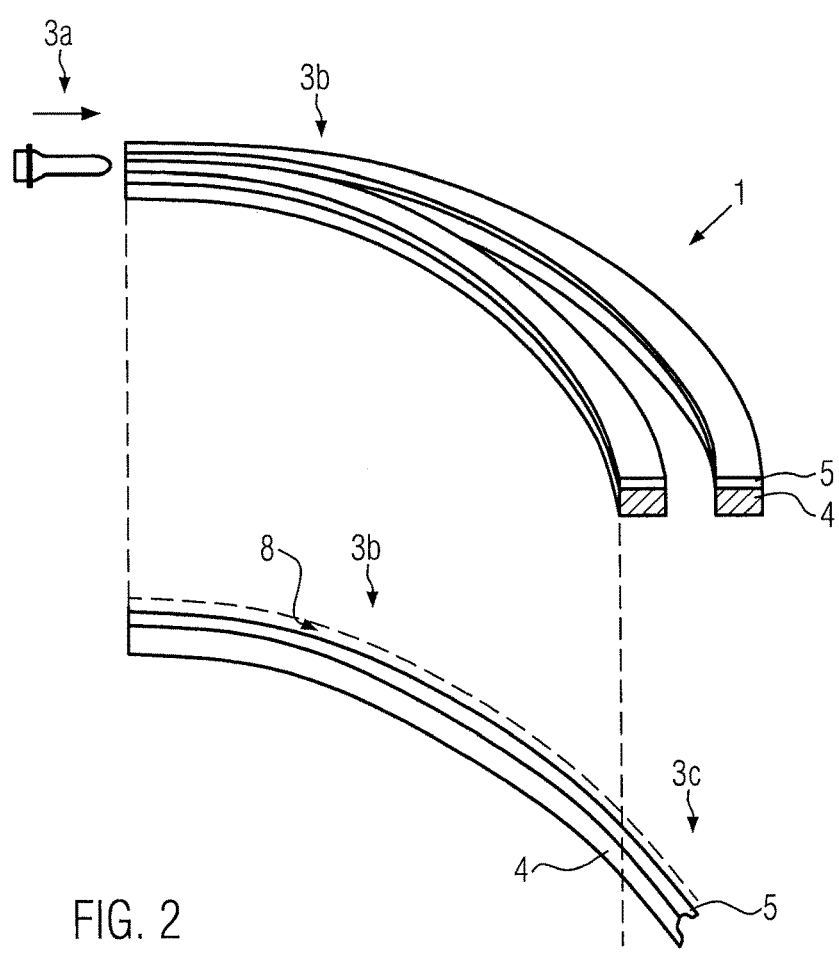
FIG. 2 shows an oblique view and a side view of an in-feed rail for preforms.

FIG. 2 in an upper oblique view and in a lower side view illustrates guide elements 4 with microporous layers 5 which are configured as an in-feed rail for preforms 2. They extend adjoining a horizontal and/or straight section 3c of transport lane 3, for example, first along a laterally and downwardly curved section 3b of transport lane 3, and then along a descending section 3c. Preforms 2 are, for example, actively ejected at the end of horizontal section 3a by a feeder or the like, and consequently slide up to section 3c where they are transported onward sliding by gravity force.

The sliding friction resistance at guide elements 4 can with the aid of air cushions 8 above microporous layers 5 be reduced to the extent that also the comparatively light preforms 2 slide reliably along sections 3b and 3c.

Conversely, the inclination required for reliable transportation of preforms 2 can be reduced with the aid of air cushions 8, in particular in the region of section 3c of transport lane 3. This enables a more compact design.

Microporous layer 5 has a thickness of preferably 10 to 200 μm. However, it would also be conceivable to form guide elements 4 with thicker microporous layers or to produce guide elements 4 in part or entirely from microporous material. All microporous layers and guide elements are for better understanding not shown to scale in the figures.

Guide elements 4 with microporous layers 5 are preferably formed selectively along lane bends and/or descending stretches, i.e. in regions of transport lane 3 in which otherwise particularly high sliding friction between guide elements 4 and the container components would be expected and/or in which the sliding transportation is effected by gravity only. However, it is basically also conceivable to form other sections of transport lane 3 with guide elements 4 and microporous layers 5 in order to there form air cushions 8 for the sliding transportation of preforms 2.

Figure 3:
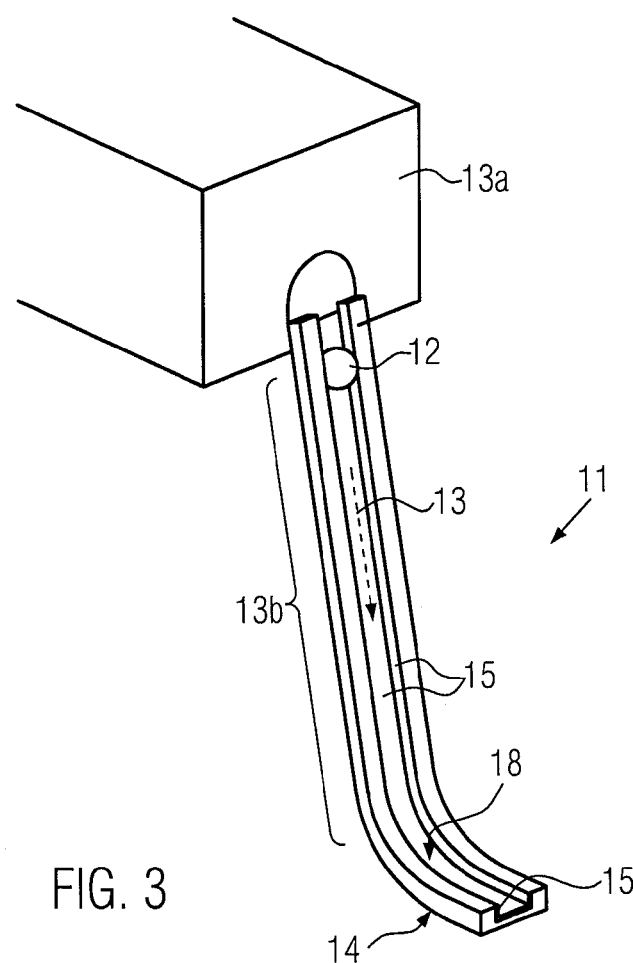
FIG. 3 shows a schematic side view of a supply for closure caps.

FIG. 3 shows guide system 11 according to a second preferred embodiment for feeding closure caps 12 to a closing machine (not shown). In this case, guide element 14 is formed along a transport lane 13 as a guide channel with an upper microporous layer 15. An air cushion 18 is thereby created on the upper side of microporous layer 15 by compressed air or the like on which closure caps 12 slide downwardly by way of a gravitational force via a section 13b of transport lane 13 being designed as a descending stretch. A hopper 13a is schematically indicated above descending stretch 13b.

Microporous layer 15 is also preferably selectively formed on the inner side walls of the guide channel. Microporous layer 15 then has approximately a U-shaped cross-section, see the schematic illustration in FIG. 3. Microporous layer 15 is preferably formed selectively on parts of guide element 14 that are configured for slidably guiding closure caps 12 which can during proper transportation contact closure caps 12.

Figure 4:
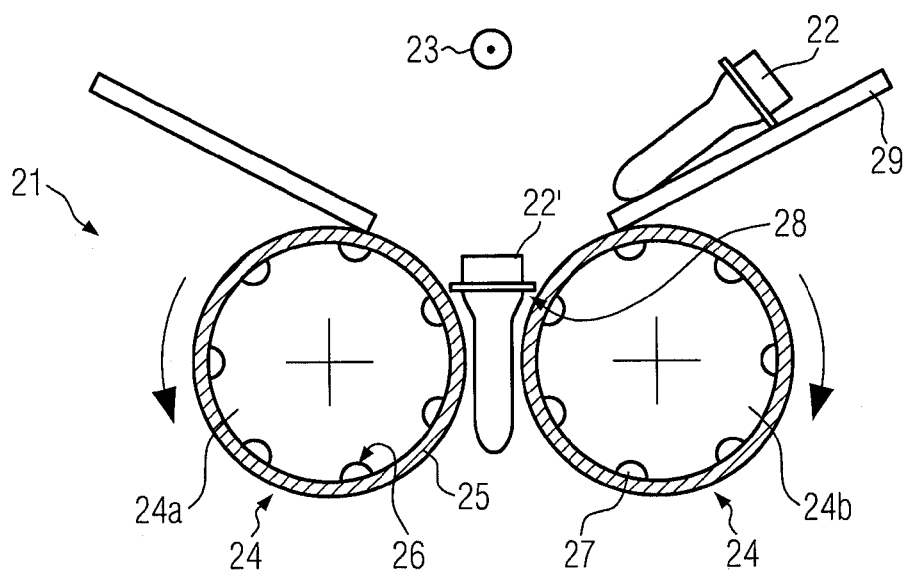
FIG. 4 shows a cross-section through sorting rollers having a microporous layer.

FIG. 4 schematically illustrates a guide system 21 according to a third preferred embodiment for sorting and/or aligning container components 22 and the sliding onward transportation of the sorted/aligned container components 22'. Two preforms are shown by way of example. According thereto, guide elements 24 in the form of sorting rollers having an outer microporous layer 25 are formed along a preferably inclined transport lane 23 (by way of example pointing out from the drawing plane).

Microporous layer 25 is supplied with compressed air 27 via schematically indicated inflow ducts 26 in order to create an air cushion 28 toward container components 22, 22' in the region above the two sorting rollers. Guide channels 26 are formed in a base body 24a of the sorting rollers, for example, being made of stainless steel and substantially being cylindrical, in the longitudinal direction thereof, substantially enclosing microporous layer 25 on the outer surface of base body 24a and inflow ducts 26.

For sorting/aligning container components 22, the latter are first accelerated by the sorting rollers transversely to transport lane 23 and are pushed, for example, onto ramps 29 which are arranged at an angle and extend along transport lane 23. Container components 22 can then from there roll and/or slide down, thereby assuming a uniform orientation with respect to transport lane 23, for example, orthogonal thereto.

Figure 5:
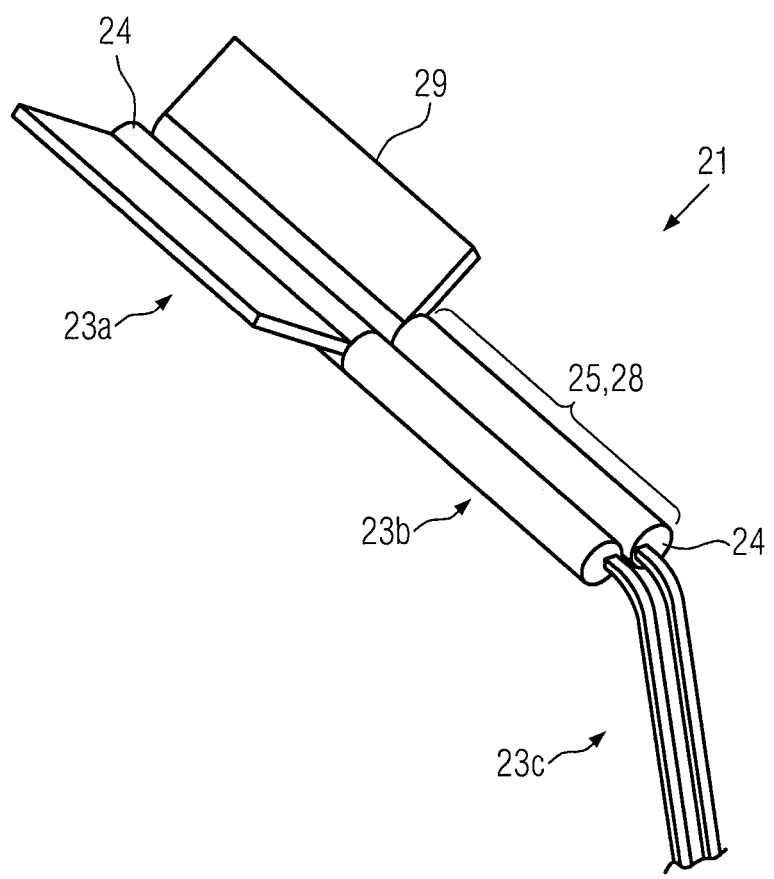
FIG. 5 shows an oblique view of the sorting rollers.

As is shown schematically in FIG. 5, this is preferably enhanced by the fact that transport lane 23 is subdivided into a sorting section 23a on the inlet side and a sliding section 23b on the outlet side which is followed, for example, by a section 23c with a steeper inclination for the sliding transportation of the sorted container components 22'.

A microporous layer 25 on guide elements 24 is then formed only in sliding section 23b, i.e., the sorting rollers. On the other hand, the outer surfaces of the sorting rollers in sorting section 23a have a higher coefficient of friction, which promotes acceleration of container components 22 to be sorted transversely to transport lane 23 on ramps 29. In the adjoining sliding section 23b, air cushion 28 allows for reliable transportation of the sorted/aligned container components 22', for example, onward to the adjoining descending stretch in section 23 c.

Microporous layer 25 could also be formed only on portions of individual sorting rollers, for example, only on axial portions of the sorting rollers within sliding section 23b and/or on circumferential portions within sliding section 23b in order to reduce the surface area creating air cushions 28 and thereby the consumption of compressed air.

Figure 6:
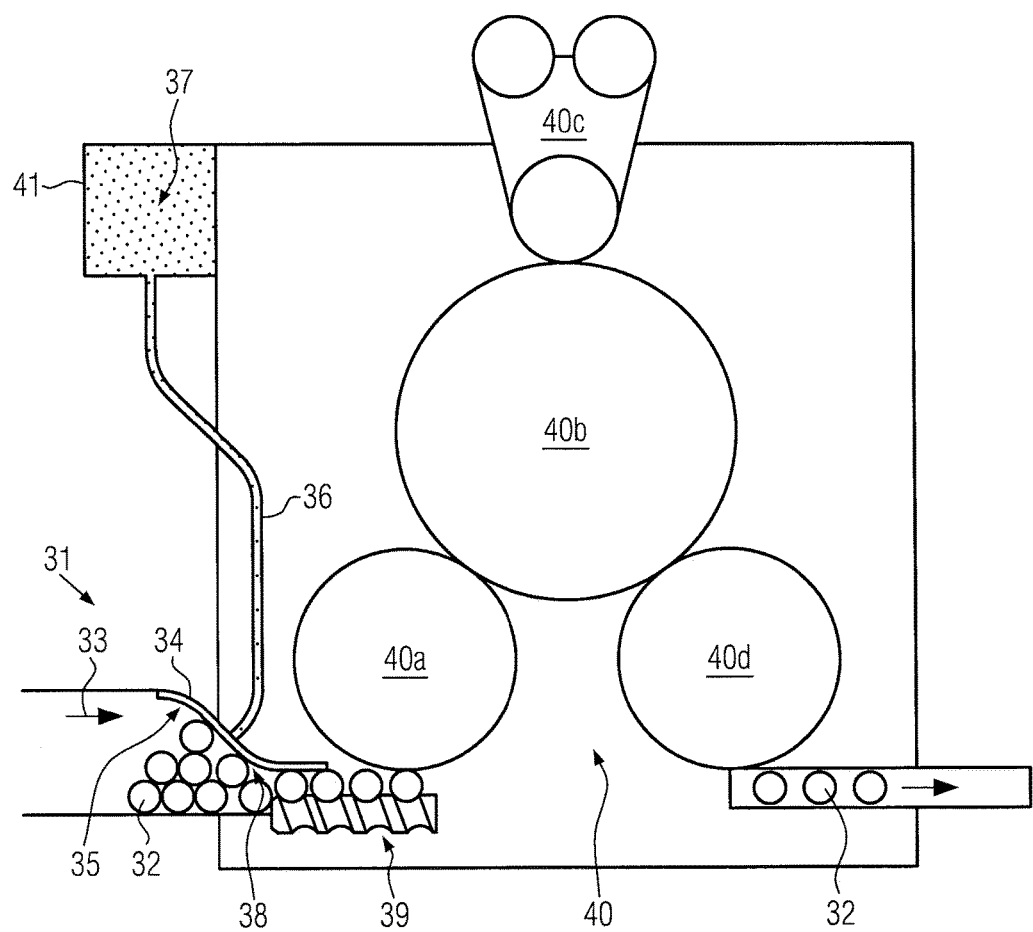
FIG. 6 shows a schematic plan view of a container supply to an in-feed worm.

FIG. 6 schematically shows a guide system 31 according to a fourth preferred embodiment in which containers 32, in particular those made of plastic material, are guided under back pressure along a transport lane 33 and are there laterally deflected by a guide element 34 that has a microporous layer 35 and narrows transport lane 33. Guide element 34 is, for example, a railing extending in an oblique and/or curved manner. Microporous layer 35 is provided with compressed air 37 or the like via at least one inflow duct 36. As a result, an air cushion 38 for low-friction feeding of containers 32 to an in-feed worm 39 or the like is created in the direction of transport lane 33.

Containers 32 jamming at the inlet region immediately upstream of in-feed worm 39 can be prevented with the aid of air cushion 38, even if containers 32 have surfaces with comparatively poor sliding properties, such as, for example, due to residual heat being present immediately after blow-molding. The comparatively light containers 32 made of plastic material then despite the back pressure slide along microporous layer 35 on air cushion 38 to in-feed worm 39 without jamming. Containers 32 then run in particular without any position gaps, i.e. transport gaps, into in-feed worm 39 and are from the latter transferred to the subsequent treatment unit as a continuous stream of containers.

In-feed worm 39 is, for example, a component of a labeling machine 40, on which an inlet star 40a, a labeling carrousel 40b, a labeling unit 40c and an outlet star 40d are schematically indicated.

Inflow duct 36 is, for example, connected to a schematically indicated compressed air supply 41.

Microporous layers 5, 15, 25, 35 are preferably formed having a pore width of 10 to 100 nm in order to enable uniform distribution of air cushion 8, 18, 28, 38 with the lowest possible pressure loss in the microporous layer.

Microporous layers 5, 15, 25, 35 preferably have a degree of hardness of 30 to 70 HRC in order to ensure gentle transportation of container components 22 in general, of preforms 2 and closure caps 12 in particular, and/or of containers 32, in particular those made of plastic material.

The sliding properties of guide elements 4, 14, 24, 34 and thereby the thickness of air cushions 8, 18, 28, 38 can be influenced by adjusting the overpressure applied to microporous layers 5, 15, 25, 35. For example, it is possible to thereby adapt sliding properties and/or sorting properties on preforms 2, closure caps 12, container components 22 to be sorted, sorted container components 22' and/or containers 32.

Preforms 2, closure caps 12, container components 22 to be sorted, sorted container components 22' and/or containers 32 can with the aid of air cushions 8, 18, 28, 38, be reliably guided along transport lanes 3, 13, 23, 33 in a sliding manner depending on the individual weight and/or sliding properties. In addition, the transportation of container components/containers is possible in a manner that is particularly gentle to the material.

Embodiments 1, 11, 21, 31 described can be particularly advantageously used in industrial plants for producing containers and/or filling products, in particular where individual treatment machines, for example blowing machines, labeling machines, filling machines or the like, are connected together as a machine block.

The resulting performance of such machine blocks can be increased in a particular manner by error prevention in the supply of container components/containers.

The invention claimed is:

1. A method for transporting containers or container components in industrial plants for producing containers and/or filling products, where said containers or container components are transported along at least one guide element, where an air cushion is created between said guide element and said containers or container components by a stream passed through a microporous layer formed on said guide element and where said guide element is provided on at least one pair of adjacent sorting rollers for sorting said container components.

2. The method according to claim 1, where said air cushion for transporting said containers or container components is created along a transport lane having a bend, in such a manner that the containers or container components slide along the microporous layer.

3. The method according to claim 1, where said air cushion is for a sliding transportation of said container components created along a transport lane having an inclination in such a manner that the containers or container components slide along the microporous layer.

4. The method according to claim 1, where said air cushion is created for single-lane transportation of said container components in such a manner that the containers or container components slide along the microporous layer.

5. The method according to claim 1, where said container components are preforms and/or closure caps.

6. The method according to claim 1, where said air cushion is created on at least one lateral guide element having a microporous guide surface in order to guide the containers with reduced sliding friction when feeding said containers under back pressure into a treatment machine.

7. A guide system for transporting containers or container components in industrial plants for producing containers and/or filling products, comprising:
a transport lane; and
at least one guide element which is formed in particular in a stationary manner along said transport lane, where said at least one guide element comprises at least one inflow duct and a microporous layer connected thereto and facing said transport lane and where said guide element is provided on at least one pair of adjacent sorting rollers and said transport lane runs in a longitudinal direction of said pair of adjacent sorting rollers.

8. The guide system according to claim 7, where said transport lane has an inclination.

9. The guide system according to claim 7, wherein the guide system is configured for transporting preforms and/or closure caps.

10. The guide system according to claim 7, where said microporous layer has a thickness of 10 to 200 μm.

11. The guide system according claim 7, where pores having a width of 10 to 100 nm are formed in said microporous layer.

12. The guide system according to claim 7, where said guide element comprises a base body made of metal, and said microporous layer is made of material galvanized or sintered thereon.

13. The guide system according to claim 7, where said microporous layer has a degree of hardness of 30 to 70 HRC.

14. The guide system according to claim 7, further comprising a compressed air supply connected to said inflow duct.

15. The guide system according to claim 7, where a microporous layer is formed selectively at at least one surface section of said guide element which is designed for slidably guiding container components or containers.

16. The method according to claim 6, wherein said containers are fed under back pressure into an in-feed worm adjoining the treatment machine.

17. The guide system according to claim 12, wherein the metal of the base body is stainless steel.

* * * * *